US007966414B2

(12) United States Patent
Cinghita et al.

(10) Patent No.: US 7,966,414 B2
(45) Date of Patent: Jun. 21, 2011

(54) METHODS FOR MULTICASTING CONTENT

(75) Inventors: Luchiana Cinghita, Arosio (CH); Ivan Stefanini, Unterageri (CH); Fabio Vallino, Azzate (IT); Andreas Delmenico, Goldau (CH); Barbara Nardello, Besano (va) (IT)

(73) Assignee: Darby & Mohaine, LLC, Wilmington, DE (US)

( * ) Notice: Subject to any disclaimer, the term of this patent is extended or adjusted under 35 U.S.C. 154(b) by 1119 days.

(21) Appl. No.: 10/278,722

(22) Filed: Oct. 23, 2002

(65) Prior Publication Data
US 2003/0093548 A1    May 15, 2003

Related U.S. Application Data

(60) Provisional application No. 60/345,501, filed on Oct. 24, 2001, provisional application No. 60/395,365, filed on Jul. 11, 2002.

(51) Int. Cl.
    *G06F 15/16* (2006.01)
(52) U.S. Cl. ........ 709/231; 709/203; 709/204; 709/223; 709/226; 709/236; 370/254; 370/255
(58) Field of Classification Search .......... 709/203–204, 709/217, 219, 223–226, 229, 230–232, 236; 370/254–255
    See application file for complete search history.

(56) References Cited

U.S. PATENT DOCUMENTS

| | | | | |
|---|---|---|---|---|
| 5,920,546 A | * | 7/1999 | Hebert et al. | 370/260 |
| 6,011,782 A | * | 1/2000 | DeSimone et al. | 370/260 |
| 6,138,144 A | * | 10/2000 | DeSimone et al. | 709/204 |
| 6,202,084 B1 | * | 3/2001 | Kumar et al. | 709/204 |
| 6,212,555 B1 | * | 4/2001 | Brooks, Jr. et al. | 709/231 |
| 6,940,987 B2 | * | 4/2001 | Brooks, Jr. et al. | 709/231 |
| 6,359,902 B1 | * | 3/2002 | Putzolu | 370/466 |
| 6,411,992 B1 | * | 6/2002 | Srinivasan et al. | 709/218 |

(Continued)

FOREIGN PATENT DOCUMENTS

JP    2000-295541    10/2000

(Continued)

OTHER PUBLICATIONS

International Search Report dated Jul. 1, 2003 for International Patent Application No. PCT/IB02/04404.

*Primary Examiner* — Saleh Najjar
*Assistant Examiner* — Shawki S Ismail
(74) *Attorney, Agent, or Firm* — Perkins Coie LLP

(57) ABSTRACT

A computer-implemented method for tunneling content across a network in which the content has been configured into a digital format compatible with a player. Prior to starting a broadcast session, an announcement is transmitted across the network which contains control information concerning the broadcast session. The control information permits controlled reception of the configured content and includes a start-time. The configured content is encapsulated into a format that supports multicast distribution and controlled reception at particular machines. The configured content is multicast across the network in the encapsulated format to a multiplicity of machines in accordance with the start-time included in the announcement. The control information is used to selectively permit reception at particular ones of the multiplicity of machines, and the encapsulation is stripped from the multicast transmission at the particular machines. As a result, the multicast of the encapsulated data is compatible with the players on the particular machines. A system for implementing UDP tunneling multicasting method is also disclosed.

59 Claims, 10 Drawing Sheets

U.S. PATENT DOCUMENTS

| | | | |
|---|---|---|---|
| 6,421,706 B1 * | 7/2002 | McNeill et al. | 709/204 |
| 6,434,621 B1 * | 8/2002 | Pezzillo et al. | 709/231 |
| 6,526,445 B1 * | 2/2003 | Kumar et al. | 709/227 |
| 6,744,741 B1 * | 6/2004 | Ju et al. | 370/260 |
| 6,795,863 B1 * | 9/2004 | Doty, Jr. | 709/231 |
| 6,950,623 B2 * | 9/2005 | Brown et al. | 455/3.01 |
| 6,970,937 B1 * | 11/2005 | Huntington | 709/231 |
| 7,006,456 B2 * | 2/2006 | Rabipour et al. | 370/260 |
| 7,013,322 B2 * | 3/2006 | Lahr | 709/201 |
| 7,024,679 B1 * | 4/2006 | Sie et al. | 725/101 |
| 7,116,641 B2 * | 10/2006 | Lim | 370/254 |
| 7,133,928 B2 * | 11/2006 | McCanne | 709/238 |
| 2002/0057663 A1 * | 5/2002 | Lim | 370/338 |

FOREIGN PATENT DOCUMENTS

| | | |
|---|---|---|
| JP | 2000-341156 | 12/2000 |
| JP | 2001-251568 | 9/2001 |
| JP | 2001-251604 | 9/2001 |
| WO | WO-01/69398 A1 | 9/2001 |

* cited by examiner

Live e-Learning Supported via an Edge Server

Scenario A

Scenario B

Scenario C

Scenario D

METHODS FOR MULTICASTING CONTENT

This patent application claims priority from U.S. Provisional Application Ser. No. 60/395,365, filed Jul. 11, 2002 and entitled "METHODS FOR MULTICASTING CONTENT" and from U.S. Provisional Application Ser. No. 60/345,501, filed Oct. 24, 2001 and entitled "METHODS FOR MULTICASTING CONTENT," the entireties of which are hereby incorporated by reference.

FIELD OF THE INVENTION

This invention relates to methods for tunneling and multicasting content across a public network.

BACKGROUND OF THE INVENTION

There are a number of media players that are available, commercially or otherwise, to playback streams of digital data. Historically, players have been configured for peer-to-peer communications of data streams between a host and the player itself. And while streams of data have been tunneled across multicast nodes of an extended network using user datagram protocols ("UDP") and the like, there remains a growing interest in multicasting streams to many players at once and traditional players are simply not compatible with existing multicast distribution schemes. The present invention satisfies this and other needs.

SUMMARY OF THE INVENTION

The invention relates to a computer-implemented method for tunneling content across a network in which the content has been configured into a digital format compatible with a player. Prior to starting a broadcast session, an announcement is transmitted across the network which contains control information concerning the broadcast session. The control information permits controlled reception of the configured content and includes a start-time. The configured content is encapsulated into a format that supports multicast distribution and controlled reception at particular machines. The configured content is multicast across the network in the encapsulated format to a multiplicity of machines in accordance with the start-time included in the announcement. The control information is used to selectively permit reception at particular ones of the multiplicity of machines, and the encapsulation is stripped from the multicast transmission at the particular machines.

The invention also relates to a system for multicasting content that has been configured at a host machine into a digital format compatible with a particular player.

In one aspect, the present invention provides a computer-implemented method for multicasting content across a public network, comprising the steps of capturing live audio as a first signal, capturing live video as a second signal, configuring the first and second signals into respective UDP streams of data packets, and encapsulating a data packet from each of the respective UDP streams together into a common data multicast protocol (CDMP) for transmission across the public network, the CDMP including header data sufficient to permit a player operating on a user machine to playback the captured audio and video.

In another aspect, the present invention provides a computer-implemented method for multicasting content across a public network, comprising the steps of capturing live audio as a first signal, capturing live video as a second signal, configuring the first and second signals into respective UDP streams of data packets, and encapsulating into separate CDMP streams the data packets of the respective UDP streams for transmission across the public network, the CDMP including header data sufficient to permit a player operating on a user machine to playback the captured audio and video.

In yet a further aspect, the present invention provides a computer-implemented method for tunneling content across a public network, comprising the steps of configuring content into a digital format compatible with a player, engrafting a header to the configured content, the header having control information permitting multicast distribution and controlled reception, multicasting across the network the configured data together with the header to a multiplicity of players, using the control information to selectively permit reception at particular ones of the players, and stripping the header from the multicast data whereby the multicast provides configured content that is compatible with the particular players.

In yet a further aspect of the present invention, specific users or machines can be targeted for strategic distribution of content by actively managing subscribers and their network access points.

Further aspects, features and advantages of the invention can be appreciated from the following detailed description and the accompanying drawings.

BRIEF DESCRIPTION OF THE DRAWING FIGURES

FIG. 1 is a first hardware configuration for practicing the present invention.

FIG. 2 profiles certain software modules in the broadcast platform that enable desktop reception of multicast content.

DETAILED DESCRIPTION OF AN EXEMPLARY EMBODIMENT

The present invention is described in connection with an embodiment that uses a broadband distribution platform operating on a programmable machine (e.g., a computer) to deliver content from a content provider to end-users across a network. Student (that is, end user) interactivity is provided through a back channel that is compatible with the content provider's infrastructure. The broadcast platform back channel need not be used for return path interactivity. Each stream sent by the content provider has a scheduled broadcast time that takes into consideration the required bandwidth of the stream(s).

Figure 1:
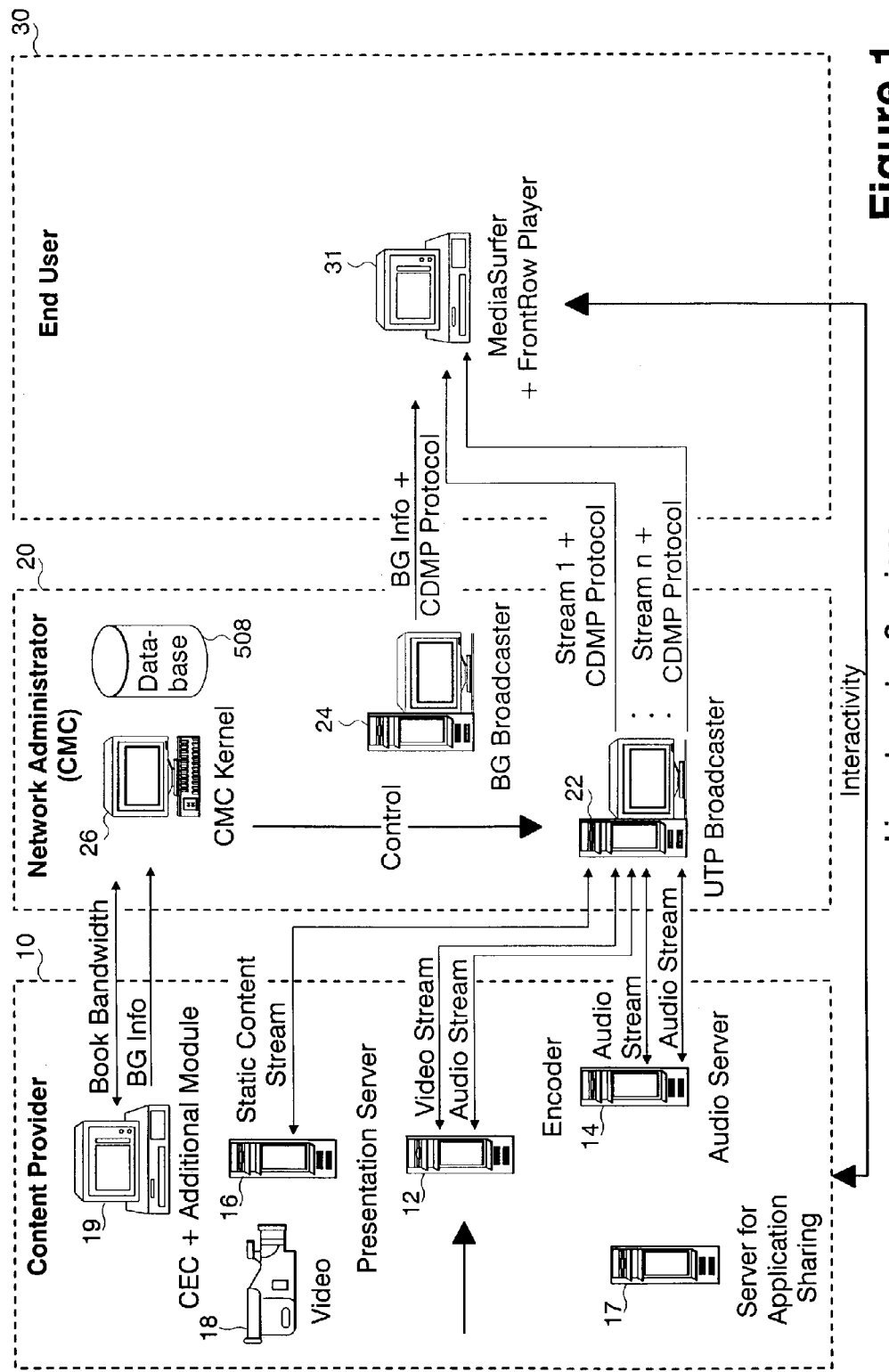

FIG. 1 shows the main platform modules involved in the delivery of the live e-learning sessions directly to a desktop computer. Specifically, there is a content provider 10, a network administrator 20 (which preferably takes the form of a channel management center ("CMC") as described in co-pending U.S. patent application Ser. No. 09/046,901, filed Mar. 24, 1998, entitled "Method and System for Broadcast Transmission of Media Objects," which is hereby incorporated by reference), and an end user 30.

More generally, however, the block diagram of FIG. 1 illustrates a broadcast system in which media objects are provided by one or more content providers (only one being illustrated in FIG. 1) to a network administrator or channel management center. The content provider has a channel editing capability that further permits scheduling of multicast transmissions to a plurality of end-users 30, only one of which is shown in FIG. 1. The channel editing capabilities of the content provider can be configured as a professional channel editing center (CEC Pro), a channel editing center (CEC), or a master channel editing center (CEC Master).

In the exemplary embodiment, the content provider is configured with an encoder 12 that can generate multiple streams of data, for example, a first stream for audio and a second stream for video. There can be additional streams such as return audio that are managed by an audio server 14. A presentation server 16 can generate multiple (e.g., twelve) streams of static content for transmission to the network administrator 20. Data can be captured using cameras 18 at the content provider or elsewhere, and combined with other materials, as may be demanded or desired for a particular e-learning session. The content provider serves as a channel editing center, as understood from the aforementioned U.S. patent application Ser. No. 09/046,901, using a computer 19 to manage content, book bandwidth, and schedule the transmission of an e-learning session. Bandwidth booking and transmission scheduling are known, for example, from U.S. patent application Ser. No. 09/738,390, filed Dec. 15, 2000, entitled, "Decision Support System and Method for Planning Broadcast Transmissions," the entirety of which is hereby incorporated by reference. The content provider 10 can further have a server 17 for sharing applications with new and prospective end users.

In alternative, more general embodiments, the content provider 10 and network administrator 20 can be configured substantially as described in the aforementioned U.S. patent application Ser. No. 09/406.901.

A suitable hardware configuration for a content provider 10 in the exemplary embodiment includes a number of components available from One Touch Systems, Inc. of San Jose, Calif. Specifically they provide a suitable encoder, presentation server, audio server and application server for use, respectively, as the encoder 12, a presentation server 16, audio server 14, and application server 17. An administrator or other person can configure these components by replacing the settings of the IP addresses and ports with ones that address the UTP broadcaster of the CMC 20. Similarly, the Web access software at the client machine 31 is set to a specific IP multicast address and port for receiving multicast transmissions from the CMC 20 or an edge-of-network server, as the case may be.

Conventionally, providers of streamed content configure their data streams for playback in suitably configured players. Among several known player types is the Windows Media Player available from the Microsoft Corporation, Redmond, Wash., and the Frontrow player of One Touch Systems, Inc. In order for such players to play back these streams, the streams must be in a compatible format. However, conventional players are suitable for unicast transmissions, that is, from a content provider to an end user. Moreover, many content providers use proprietary players, which expect the data to be played to be in a particular format, sometimes including control or management keys that govern the viewability of data streams at a given end user. Therefore, the present invention seeks to overcome traditional constraints on streamed transmissions by enabling multicast transmissions of streamed content, regardless of the format of the underlying streams.

The broadcast platform of the exemplary embodiment first configures all of the streams from the content provider as user datagram protocol ("UDP") streams at a UDP tunneling ("UTP") broadcast server 22 located at the network administrator 20. The UTP broadcaster 22 then encapsulates packets of the UDP streams within common data multicast protocol ("CDMP") packets. The CDMP packets, described below, permit subscription management and multiplexing of the streams across a multicast platform. The network administrator preferably has a broadcast guide server 24 that provides broadcast guide information to subscribing end 20 users. The network administrator coordinates broadcast requests received from the content provider's computer 19 at a CMC kernel 26. The CMC kernel communicates and manages those requests with the assistance of the broadcast guide server 24.

In an alternative arrangement, UDP streams are provided directly by the content provider 10 to the network administrator 20 where they are encapsulated into a format that supports multicast distribution (e.g., a CDMP packet format).

The CDMP streams are multicast across a public network and are received at a multiplicity of end users 30 (only one shown in FIG. 1). Each end user has a client machine 31 that runs a variety of programs on any one of a number of operating platforms. Among the programs executing at the client machine 31 are a multicast-ready Web compliant interface (e.g., a plug-in software module for a Web browser) and a suitable player. Preferably, the multicast-ready interface ("MRI") is the MediaSurfer (trademark) software product available from the Fantastic Corporation, Zug, Switzerland. The player can be the FrontRow (trademark) player of One Touch Systems, Inc. or some other player such as the Windows Media Player of the Microsoft Corporation, Redmond, Wash. or the RealPlayer of RealNetworks, Inc. The CDMP streams include a header and preferably encapsulate the UDP streams or are otherwise encapsulated so as to include information that permits multicast distribution and controlled reception at authorized and intended end user machines. The streams are unwrapped or reconfigured upon reception at the client machine by the MRI. The MRI outputs packets that are compatible with a player running on the client machine 31.

The encapsulation or engrafting of packets in order to enable multicast transmissions of configured content is performed at the network administrator 20. Illustratively, the network administrator 20 includes one or more subscription control managers (e.g., within the CMC kernel 26) whose function is to encapsulate or encode media objects in accordance with subscription information from subscription database 508. A subscription-information retrieval manger retrieves subscription information for the received media object from database 508 and transmits the information to the subscription control manager. The subscription control manager encapsulates, encodes, or both encapsulates and encodes the media object in accordance with the subscription information received from the database 508.

The encapsulation or encoding employed by the present invention may take many forms. For example, subscription control manager may be programmed to identify the header and tail of a packet and wrap an additional protocol layer of subscription information around the packet.

Alternatively, the subscription information retrieved from subscription database 508 may comprise instructions to encode the media object in accordance with particular encryption software. Only clients who have subscribed to the service, and thus have the corresponding decryption software, will be able to receive the broadcast object.

In an alternative embodiment, the subscription information may be embedded in the transmission bitstream for example by watermarking each data packet. In this alternative embodiment, the subscription information need not be added to the bitstream by subscription control manager 506b. The subscription information may be added to the data at any point in the system and may be added by the content provider or by another party.

As described below, use of encapsulation or encoding permits the system of the present invention to enable or disable receipt of particular services by particular end-users.

The client machine 31 has access to broadcast schedule information that informs the end user of available programming options. Preferably, each UDP stream generated in a single teaching session is included together in a single schedule. The client machine 31 in the exemplary embodiment is a personal computer; however, the invention may also be practiced using other devices for receiving the broadcast media objects, such as set-top cable boxes, provided that the devices comprise adequate hardware and software to achieve the functionality described below.

Figure 10:
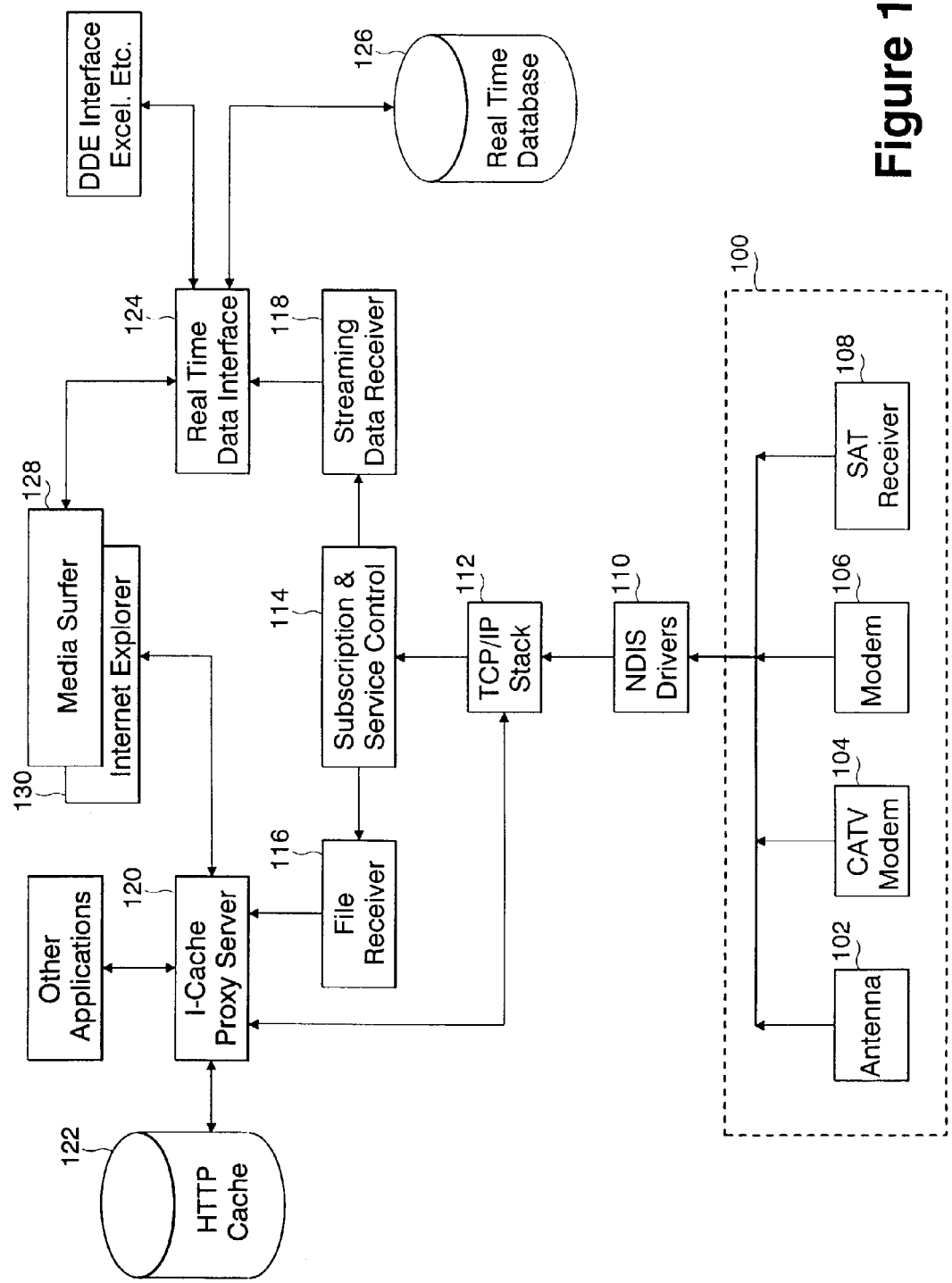
FIG. 10 is a block diagram of an exemplary embodiment of a client machine that may be used to practice the present invention.

An exemplary client machine 31 is illustrated in block-diagram form in FIG. 10. Client machine 31 preferably comprises a receiver 100 connected to a layered protocol such as TCP/IP stack 112 via NDIS drivers 110. TCP/IP stack 112 is connected to a subscription manager 114 whose purpose is to control access by the end-user to received information and to maintain a list of information services for the end-user.

Receiver 100 preferably comprises one or more components 102-108 adapted to receive broadcasts from broadcast facility 25. Receiver 100 may comprise an antenna 102 for receiving Rf television transmissions, a CATV modem 104 for receiving cable-TV transmissions, a satellite receiver 106 for receiving satellite transmissions, and/or a modem 108 for receiving transmission via a data link, depending on the broadcast technology employed by broadcast facility 25.

As noted, receiver 100 is coupled to a protocol stack such as TCP/IP stack 112 via NDIS drivers 110. In a preferred embodiment, TCP/IP stack 112 may comprise the Winsock (TM) TCP/IP stack manufactured by Microsoft Corporation. As known to those skilled in the art, one purpose of TCP/IP stack 112 is to examine the arriving data packets that make up a transmitted file or other media object to determine that all packets that make up the file have been received, and that they have been received in the correct order.

Once TCP/IP stack 112 verifies accurate reception of a TCP/IP communication, the communication is transmitted to subscription manager 114 which determines the subscription and service to which the communication belongs. Subscription manager 114 then determines whether or not client machine 31 is authorized to receive the transmissions belonging to the identified service, and if authorized, whether the service has been enabled by the end-user.

Specifically, subscription manager 114 preferably comprises a software program running in the background of end-user client machine 31. When desired, however, the end-user may maximize subscription manager 114 and have it display the list of services which end-user client machine 31 is authorized to receive, i.e., all services included within subscription packages to which the end-user has subscribed. The end-user may then manually enable or disable services within a subscription package. For each authorized subscription package, subscription manager 114 maintains a record of the services that have been enabled and disabled by the end-user.

Then, when a communication is received, subscription manager 114 first determines whether the transmission belongs to a service to which the end-user has subscribed. Subscription manager 114 typically makes this determination by examining the received communication and determining whether it has the subscription information necessary to decode or unencapsulate the transmission.

As noted above, use of encapsulation or encoding permits the system of the present invention to enable or disable receipt of particular services by particular end-users. In a preferred embodiment, the system may enable particular PCs 30 to receive particular services by broadcasting a subscription message addressed to all end-user PCs that have subscribed to the service. The message preferably comprises information concerning the particular times and channels on which the service will be broadcast and may also include information on the encapsulation protocol employed to encapsulate the transmission. If the service is encrypted, the subscription message may comprise information necessary to decrypt the transmission, as well. With this information, client machine 31 is able to identify broadcast transmissions belonging to the service, strip off the encapsulation information, de-encrypt the transmissions (if necessary), and provide the content of the transmissions to the end-user, as described in more detail below.

Disabling of a particular service can be accomplished by including a timestamp in the subscription message instructing PCs 30 to delete the subscription message from their memories (or instructing PCs 30 not to use the information contained in the service parameter message), after a certain time period. Alternatively, the system may alter the channels and times for broadcast of particular services so that continued receipt of these services requires additional service parameter information not available to PCs 30 that are to be disabled from receiving the service. In addition, if the service is encrypted, specific PCs 30 may be disabled by modifying the encryption and not transmitting an updated subscription message concerning the new encryption to the disabled PCs 30. A service may also be disabled on one or more particular PCs 30 by addressing a disable-service message for the service to the particular PCs 30 which are to be removed from the service.

As noted, subscription messages to enable/disable particular services may be addressed to specific PCs 30. In particular, each client machine 31 may be assigned a unique address. Subscription messages comprising the addresses of particular PCs 30 are transmitted that instruct each addressed client machine 31 to enable and/or disable particular services in the manner described above. The unique address is preferably implemented in hardware to avoid users configuring multiple PCs 30 to have the same address. When subscription manager 114 recognizes a subscription message addressed to its client machine 31, it updates the subscription information in accordance with the contents of the received message.

Alternatively, instead of addressing subscription information to particular PCs 30, the system may regulate access to subscription information in other ways. For example, the subscription information may be encrypted or encapsulated before broadcast so that only PCs 30 with the proper decryption on deencapsulation information are able to receive the subscription information. Also, the subscription information may be broadcast at a specific time and on a specific channel known only to those PCs 30 that have subscribed to the service to which the subscription information pertains.

If multicast transmission received at a client machine 31 belongs to a subscribed service, subscription manager 114 then determines whether or not the end-user has enabled the service.

Assuming the service is both subscribed and enabled, subscription manager 114 next determines whether the received packet is part of a static media object such as a file or a dynamic media object such as a streaming data transmission. If the packet is part of a file, subscription manager 114 transmits the packet to file receiver 116. Similarly, if the packet is part of a streaming data transmission, subscription manager 114 transmits the packet to streaming data receiver 118.

File receiver 116 is connected to an I-cache proxy server 120 which manages an HTTP cache 122. In a preferred embodiment, HTTP cache 122 stores all received internet data. The user may then send a URL request to the file and gain access to its contents. Alternatively, the received information may be stored in a different memory and may be accessed using a browser.

HTTP cache 122 may be adapted to manage the incoming data in a large number of ways. Illustratively, cache 122 may be programmed to overwrite older data as new data is received, or may be programmed to cease storage of incoming information once the amount of information stored in cache 122 reaches a threshold.

Streaming data receiver 118 is connected to a real-time data interface 124 which manages play-out of the streaming data to an output port for display to the end-user of client machine 31. In some circumstances, play-out may be via an additional interface, such as a DDE interface, Excel (TM), etc. Real-time data interface 124 is connected to a real-time database 126 which may temporarily store the received streaming data during play-out.

Client machine 31 may further be provided with several software tools, including an HTTP or web browser such as a media surfer (TM) 128 and internet explorer (TM) 130, to aid the end-user in navigating the received files and streaming data.

The objects to be broadcast may be compressed prior to transmission and scheduled for broadcast in accordance with their bandwidth requirements in compressed form. Decompression is performed by client machine 31 when it receives the broadcast, thus permitting media objects to be broadcast in compressed form in a manner transparent to the end-user of client machine 31.

The announcements precede a UDP tunneling session. Before starting a broadcast session, the content provider 10 schedules a transmission by booking the necessary bandwidth and transmitting broadcast guide ("BG") information using the booking system software at the computer 19. Schedule and BG information includes: broadcast start time, broadcast duration and channel-group/channel. This information is transferred to the CMC 20, which, in turn, broadcasts the information to the MRIs. A graphical user interface ("GUI") of the MRI preferably displays a single BG announcement for each teaching session that can be played. More preferably, the various teaching sessions are filtered to display BG announcements that are intended for, subscribed to by, or within a channel accessible by a given end user. Announcements are listed by the channel that will be used during the broadcast. By selecting a BG announcement (e.g., using a mouse connected to the client machine 31 or other input device), a UDP tunneling session is started, which receives and processes CDMP packets and forwards player-compatible streams to the player.

At the scheduled start time, the content provider 10 starts the data stream transmission. To view the content, the end user starts his or her player at the client machine 31. The player can be run from the same computer 31 that runs the MRI or on a different computer. Either way, the player receives the data stream from the content provider if it has been configured to receive data on the addresses/ports set in the MRI. Most preferably, a user can start a player by selecting a BG session announcement displayed in the GUI of the MRI. Such integration between the MRI and a player on a local machine can be accomplished by mapping specific announcements with the IP multicast address and port of that player.

Because a broadcast session can include multiple streams, a simplified booking and bandwidth scheduling results from multiplexing all data streams from a content provider 10 that relate to a single session (e.g., a teaching session). In the exemplary embodiment, this is achieved with an application resident at the content provider's computer 19 that is built upon the booking system (and optionally part of the CEC software itself) to permit an instructor to book once all of the streams associated with a single e-learning session. This application, referred to herein as a One Session Module 40 ("OSM") manages the actions required by the CMC 20 to transport the session to end users. Specifically, the OSM 40 automates the booking of multiple, related streams (e.g., separate video and audio streams) in a single teaching session. On the one hand, the required bandwidth to be booked can be readily determined for multiple presentation streams as they typically use 64 Kbps. Four schedules ordinarily are booked, for example, three for the respective audio streams and one for the video stream. Both shared and private bandwidth can be used. On the other hand, calculating the bandwidth usage for the static content is somewhat more complicated because the number of streams is not fixed and typically varies from one to twelve. Thus, the bandwidth required for the single, multiplexed stream cannot be determined, and only the total bandwidth needed to accommodate the static content can be computed.

The OSM 40 can utilize one of the following alternatives to address the bandwidth performance puzzle:

1) A schedule can be booked for each static content stream. The UTP broadcaster 22 monitors all of the ports that can have a static content stream (e.g., twelve).

Figure 2:
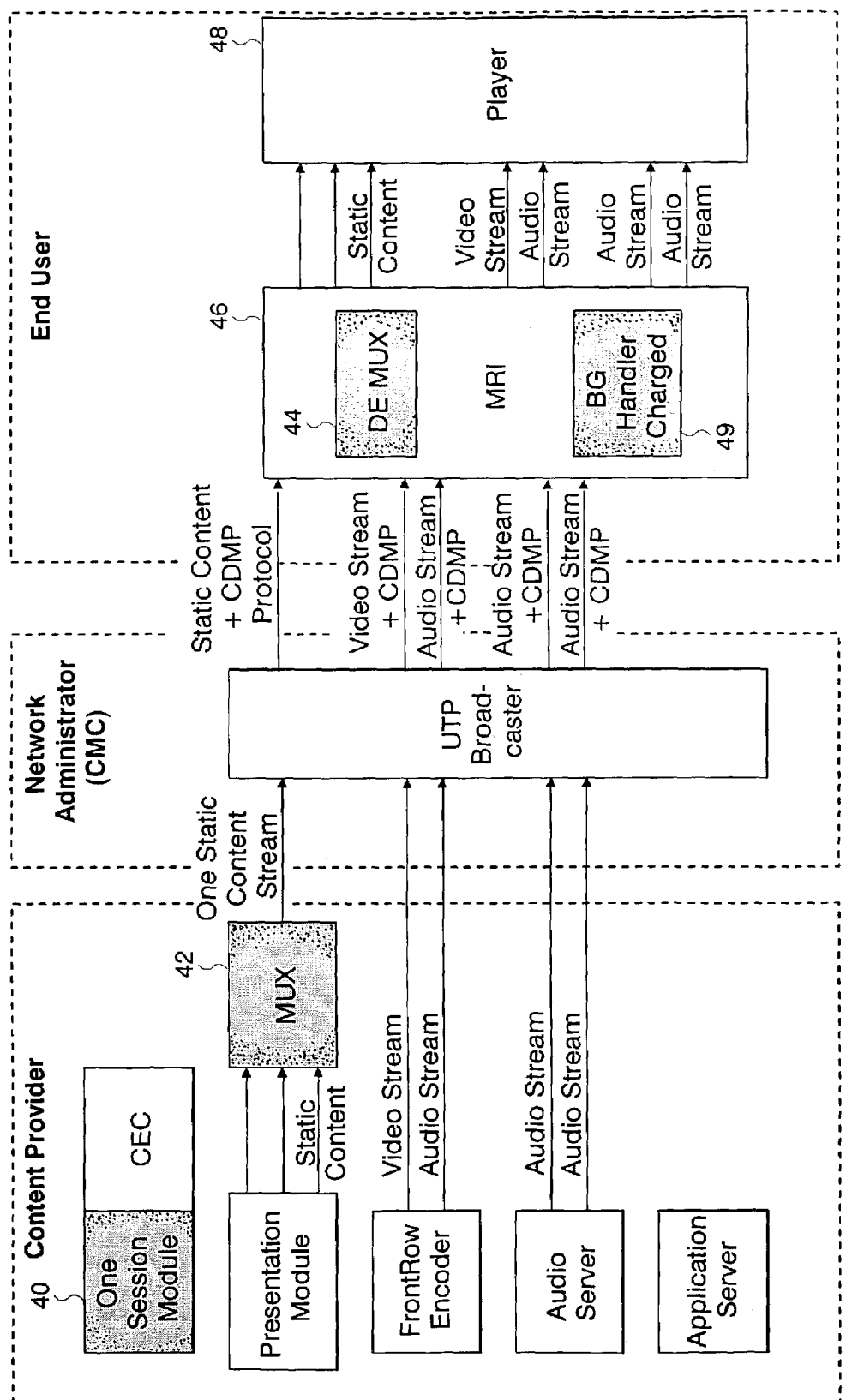

2) A schedule can be booked for one of the static content streams, and multiplex all streams into a single stream using a multiplexer 42 at the content provider 10 or at the CMC 20, if desired, ahead of the UTP broadcaster. As shown in FIG. 2, the UTP broadcaster 22 monitors the multiplexed stream on a prescribed port and, when this data is received, a de-multiplexer 44 resident within or associated with the MRI 46 can provide de-multiplexed streams to a player 48 for playback. This solution could create synchronization problems in view of the latency introduced by the multiplexing/de-multiplexing process. The latency effect is not presently believed to be high since the content is static, and any latency can be addressed by the player upon playback to restore synchronization with other streams. Any latency effect may also be offset by performance improvements due to the reduction in listening threads that need to be run to monitor multiple static-content streams. The MRI 46 receives BG announcements for each single session, and these announcements are handled by a BG handler 49 within or associated with the MRI 46 in order to be displayed in a broadcast guide to the end user.

The OSM 40 can define a single stream for all the audio, video, and static content streams that are created with or associated with a single learning session, and this information can be passed to the UTP broadcaster 22. In this way, the BG information management can be as described in the aforementioned U.S. patent application Ser. No. 09/738,390 because only one booking is be required to broadcast the entire session.

For live session recording, a session can be delivered to end users using a package delivery (very reliable) or cached content delivery configuration in which the MRI 46 stores the session file on a hard disk or other repository in a specified location. This file can be accessed and viewed at any time using the player 48.

When using package delivery (PD) for recorded sessions, a teaching session is initially recorded in a file. The content provider 10 schedules a PD transmission, booking the necessary bandwidth and providing BG information using the booking system as described above. Schedule and BG information includes the file broadcast start time, file broadcast duration, channel-group/channel and file size. In a preferred embodiment, the BG information identifies the type of media so that the media objects can be processed and so that the appropriate player can be launched at the client machine 31. As noted above, the player can be started by selecting a BG session announcement displayed in the GUI of the MRI. This file is then uploaded to the CMC 20 for broadcast to the machines having the MRIs 46. The MRI GUI preferably displays one BG announcement for each recorded session file. Announcements can be listed by the channel used to broadcast each session. The machine having the MRI 46 receives the file and stores it on the hard disk in a pre-configured location. Once the file is stored on that machine, an end user can either open the file with a player 48 by selecting the related BG announcement or by accessing the repository directly. It should be understood that the MRI 46 can be resident on a different machine than the player 48 (e.g., when the MRI 46 is a local area network server or edge-of-network server).

Cache content delivery (CCD) can be used to deliver files to the MRI 46 if the MIME type of the file containing the recorded teaching session can be recognized by a Web browser (e.g., Internet Explorer available from the Microsoft Corporation). In this mode, a teaching session is recorded in a file, and the content provider 10 schedules the CCD transmission, booking the necessary bandwidth and BG information using the booking system, again, as previously described. The teaching session file is uploaded to the CMC 20 for broadcast to the machines hosting the MRIs 46. The MRI GUI displays a BG announcement for each recorded session file, with announcements being listed by the channel used to broadcast each session. End users access previously recorded sessions at a player 48 by selecting the related BG announcement or by accessing the repository directly.

The discussion above generally concerned a delivery mechanism that multicasts content to MRIs 46 to a desktop machine; however, the invention is not so limited. Instead, intelligent caching technology can be utilized to multicast to a network edge server, as described next with reference to FIG. 3.

Figure 3:
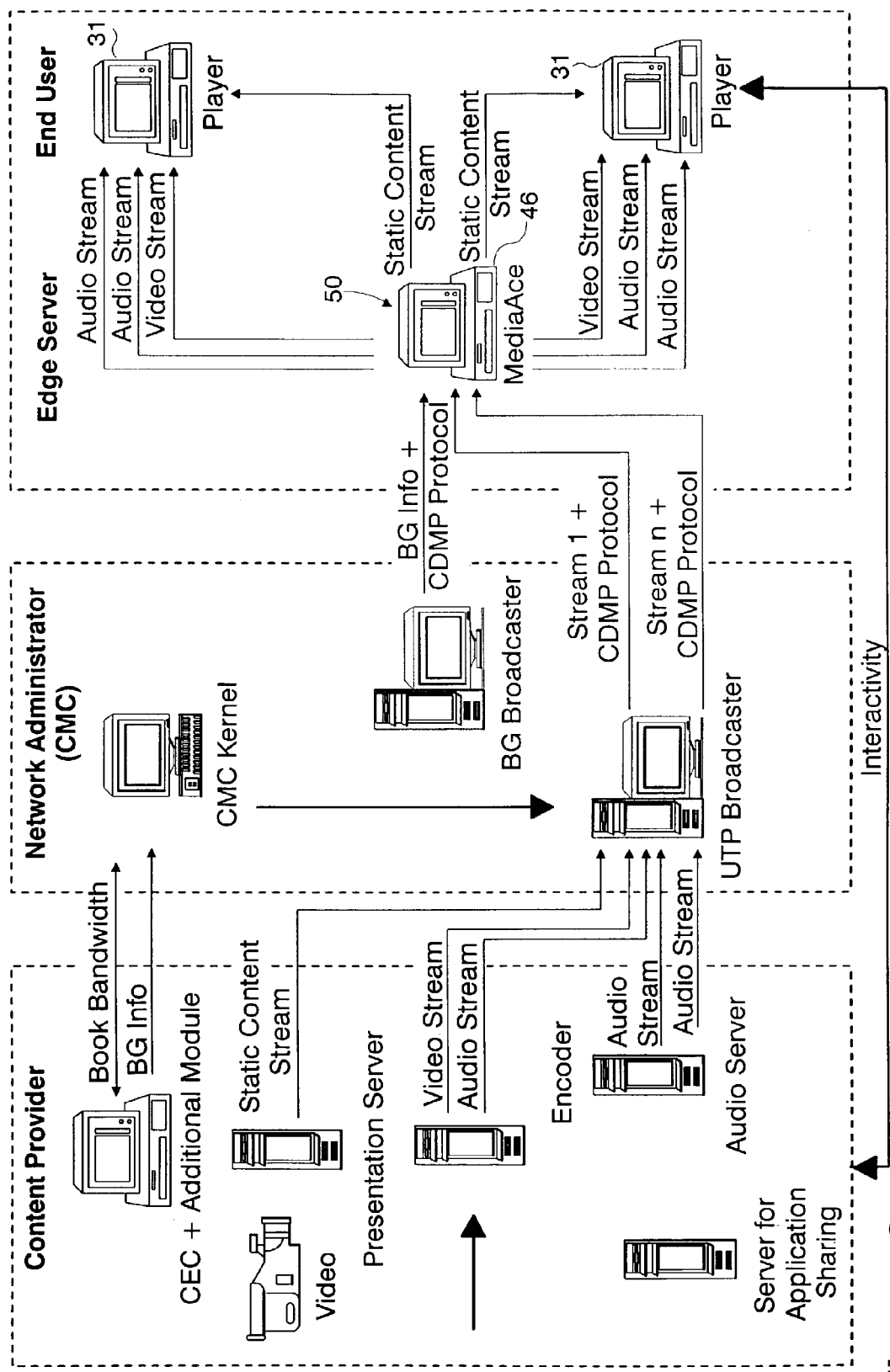
FIG. 3 is a second hardware configuration for practicing the present invention using an edge of network server.

FIG. 3 illustrates a variation of the arrangement of FIG. 1 in which an intelligent cache 50 has been situated in the flow of multimedia content between the CMC 20 and the end-user machines 31 and their respective players 48. More specifically, the intelligent cache is situated at the network edge proximate a number of end users. A typical configuration might employ a number of such machines about the network perimeter. The intelligent cache 50 provides multimedia services to a multiplicity of client machines 31 having respective players 48. Among the services provided by the intelligent cache 50 is the caching of multimedia content, caching of guaranteed content, streaming management, broadcast guide forwarding, local end-user administration and interfacing to the CMC 20 to end-user subscription information.

The intelligent cache 50 preferably has the MRI executing therein so that multicasting can be processed at the cache and terminates at that machine. End users that access the cache need only have a suitable player to retrieve the content provider's streams. Preferably, the intelligent cache comprises the "MediaAce" ("MA") product of The Fantastic Corporation, Zug, Switzerland, and is used to manage reception and process and store all broadcast sessions.

The configuration of FIG. 3 operates substantially as described above with respect to the types and number streams, their scheduling, booking and broadcasting. In this arrangement, however, the MA module of the intelligent cache 50 receives CDMP packets containing original presentation streams, and provides teaching session announcements to end users through a portal page. End users, by means of a conventional Web browser, access the portal page and select specific session announcements, as desired. This is possible because the multicast has terminated at the intelligent cache 50, and data transfer thereafter is in a format compatible with the player 48 and so individual client machines 31 do not require the MRI 46 (or MA module) to access and view multicast content from the content provider 10. Any selection made from the portal page causes the MA to forward presentation streams to the requesting player.

Figure 4:
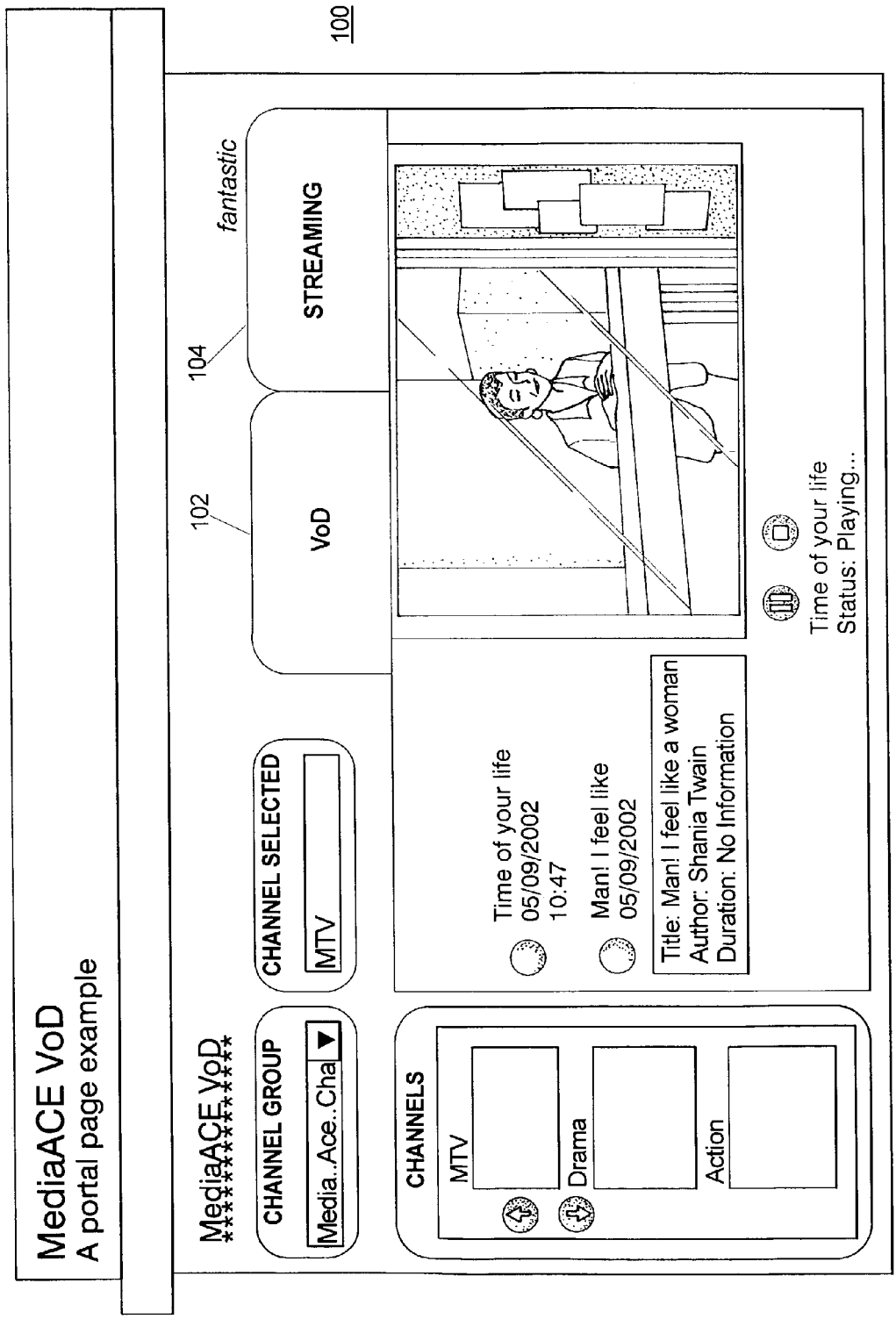
FIG. 4 is a first screenshot of a portal page of an exemplary implementation of the invention.

Announcements of content broadcasts on specific channels can be presented in a variety of views, including video on demand ("VoD") and streaming. FIG. 4 provides a portal page 100 with exemplary tabs 102, 104 to select between these views. For live training sessions, the portal page 100 requires a further view in which the MA portal page displays a BG announcement for each teaching session. Announcements are preferably listed by the channel used in the broadcast.

A user can select a BG announcement in the portal page 100 using a standard input device (e.g., a mouse) and cause a local presentation player to start. The player is previously be configured to receive on the IP address and port used by the MA on which the MRI 46 is forwarding the streams. This is made possible by changing the player's configuration, as described above. Integrating control of the player 48 into the portal page 100 provides an additional advantage of allowing the end user to click-start playback.

Figure 5:
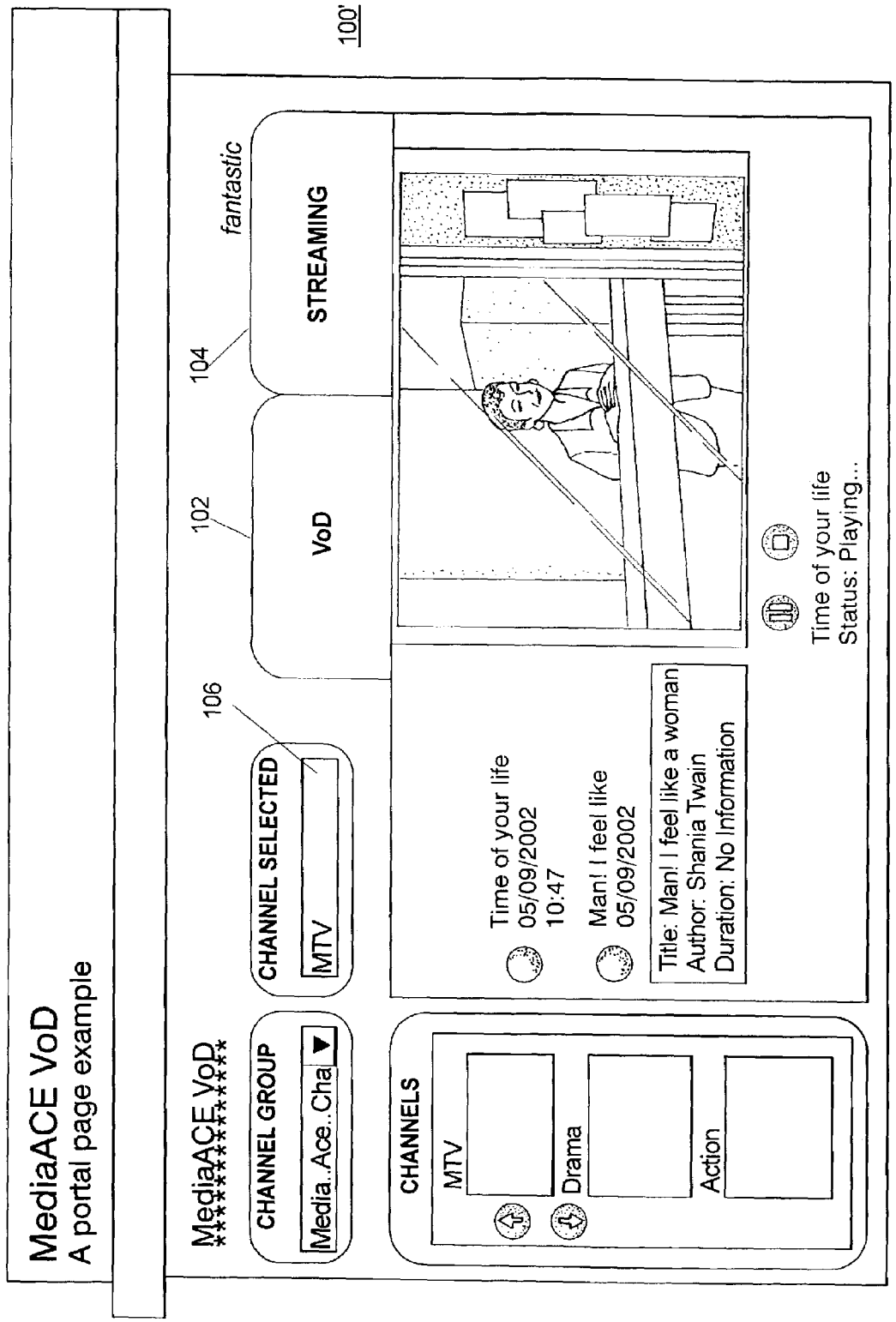
FIG. 5 is a second screenshot of a portal page of an exemplary implementation of the invention.

If a live session has been recorded in a file, the broadcast platform of the present invention can deliver that file in a reliable way through the PD system. (The file can be delivered to the CMC 20 administrator using a number of electronic protocols, including electronic mail protocol.) Specifically, a teaching session is recorded in a file. Next, the content provider schedules the PD transmission, books the necessary bandwidth, and broadcasts BG information using the booking system, as described above. Both the file and BG information are uploaded to the CMC for broadcast to MA. The file containing the teaching session is received at the machine having the MA module (e.g., the intelligent cache 50) and stored on a file server in a pre-configured repository. MA adds an announcement for the file received in the MA view of the portal page 100. The end user can then download the file to his or her machine 31 and view it with the player 48 or other on-demand application. In FIG. 5, a portal page 100' shows a selectable tab 106 that brings to front the MA view.

The MA includes a driver that allows the file to be referenced from the MA view and retrieved from storage. Within the MA view of the portal page 100', the BG announcement contains a URL referencing the file stored on the file server.

The end user can retrieve the file simply just by clicking on the announcement, with the file being played by the player 48 or another client application.

The present invention is now described in connection with four integration scenarios, each of which makes use of the CEC and CMC broadcast platform described above. The scenarios differ from one another in the way end-users access live or on-demand training sessions.

Figure 6:
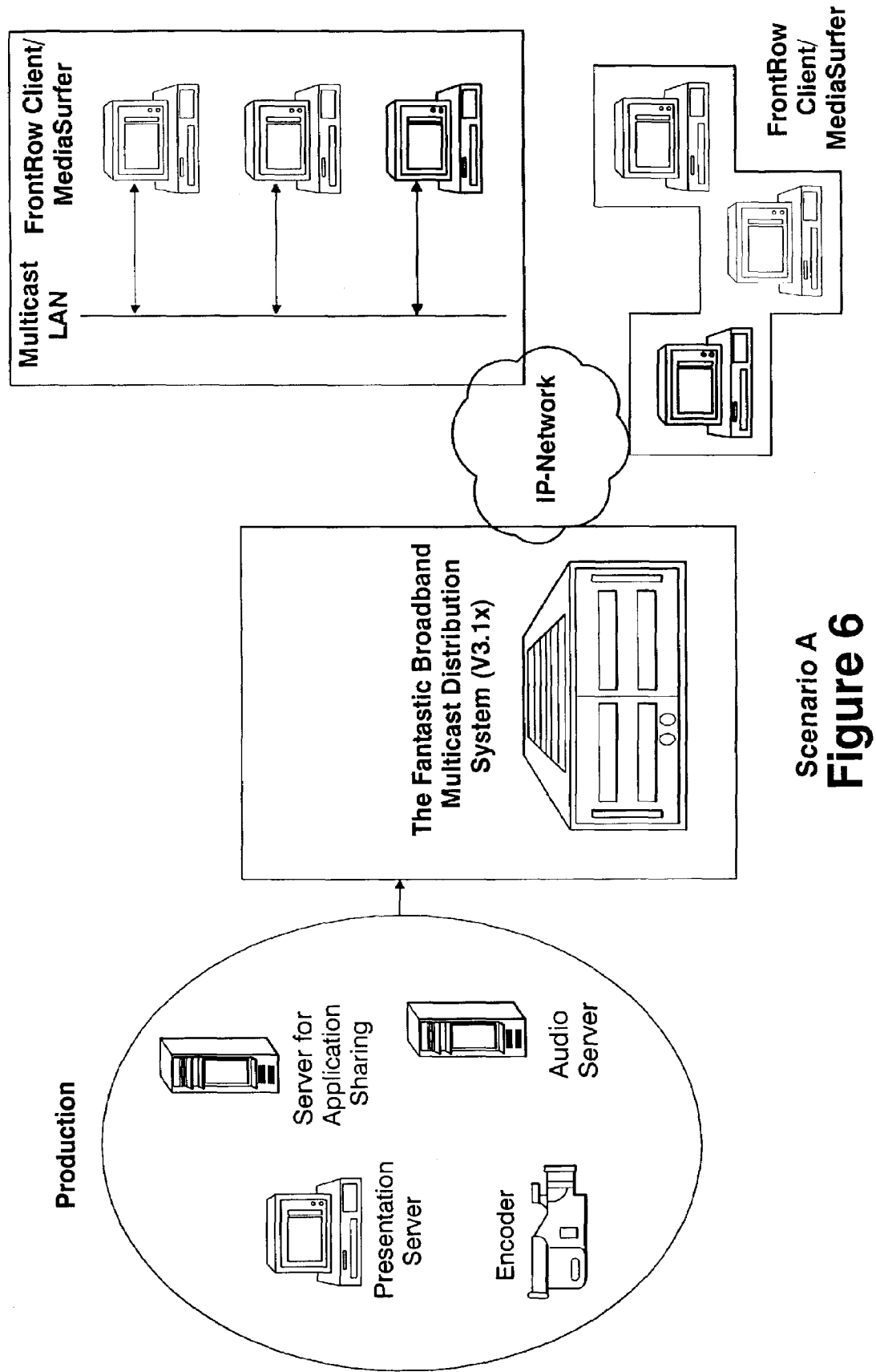
FIG. 6 illustrates a first operating scenario in accordance with the invention.

FIG. 6 illustrates a scenario in which a live e-learning is broadcast directly to a client desktop computer 31 having a player 48 and MRI 46 software executing thereon. Live training sessions are created using the hardware components 12-18, described above. Live AV-streams and fixed content are scheduled, booked, uploaded and broadcast via a broadcast platform comprising the CEC 19 and CMC 20 (including BG broadcaster 24 and CMC kernel 26) to the client desktops. The broadcast is a multicast transmission that is not otherwise compatible with typical players 48, or the original streams provided by the content provider 10. However, on the client side, the MRI 46 receives live AV-streams and fixed content, unwraps them into an understandable format, and makes these streams available to a client application such as the player 48. Recipients access live sessions through an MRI 46, e.g., by clicking on a session announcement within an MRI Broadcast Guide viewer. A user name and password can be required to select and/or play the session.

Figure 7:
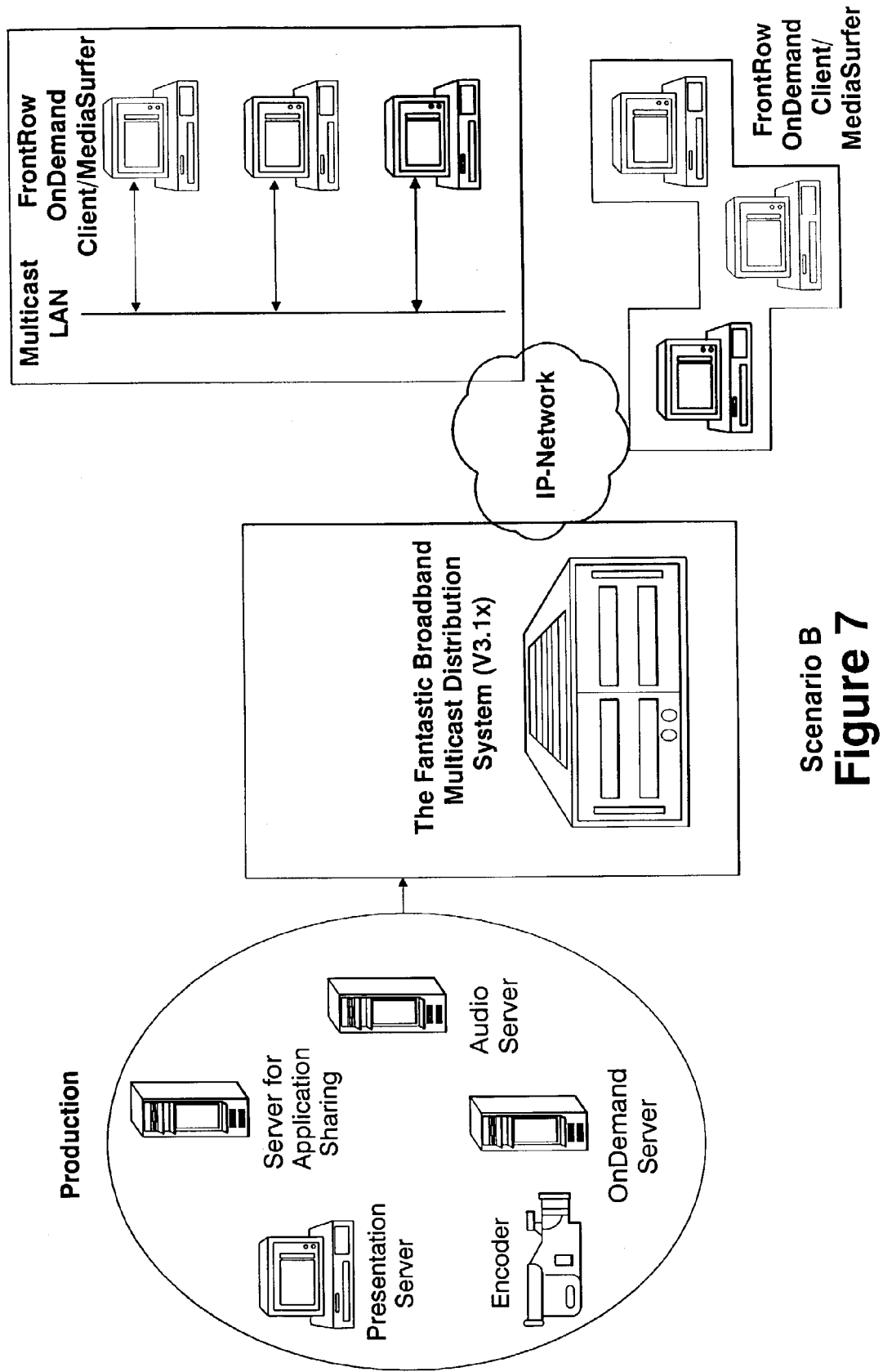
FIG. 7 illustrates a second operating scenario in accordance with the invention.

FIG. 7 illustrates a scenario in which live and on-demand sessions are broadcast directly to client desktop. This scenario permits live sessions to be recorded. Recorded live sessions can be made available for on-demand viewing by a given end-user. Sessions recorded and stored on a server are distributed via the broadcast platform directly to an MRI 46. These sessions can be broadcast either as cache content delivery or as package delivery. Users are able to access on-demand sessions via an MRI broadcast guide viewer or other application. By either clicking on the session announcement in an MRI broadcast guide viewer or by selecting the start file stored on the client hard disk a logging web page can be presented in which the user enters a user name and password to start the viewing session. The viewing session can be activated within the MRI 46.

Figure 8:
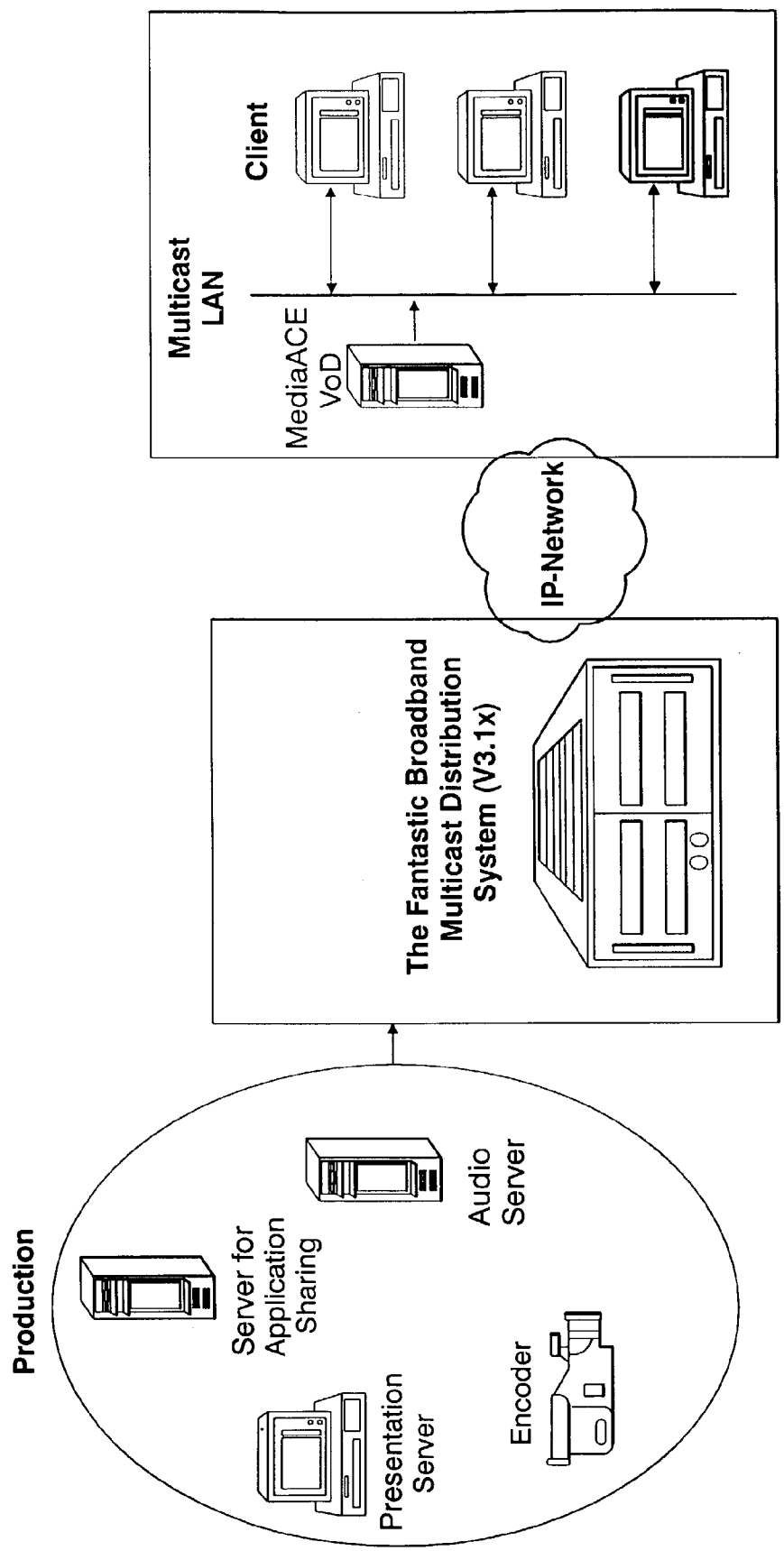
FIG. 8 illustrates a third operating scenario in accordance with the invention.

In the scenario of FIG. 8, live sessions are broadcast to the MA and are then forwarded to client desktop machines. By broadcasting live sessions to a MA located at the entrance of a multicast enabled LAN, there is no need to install the MRI 46 on the client's desktop machine. Again, users access live sessions through the MA portal page 100, 100'.

Figure 9:
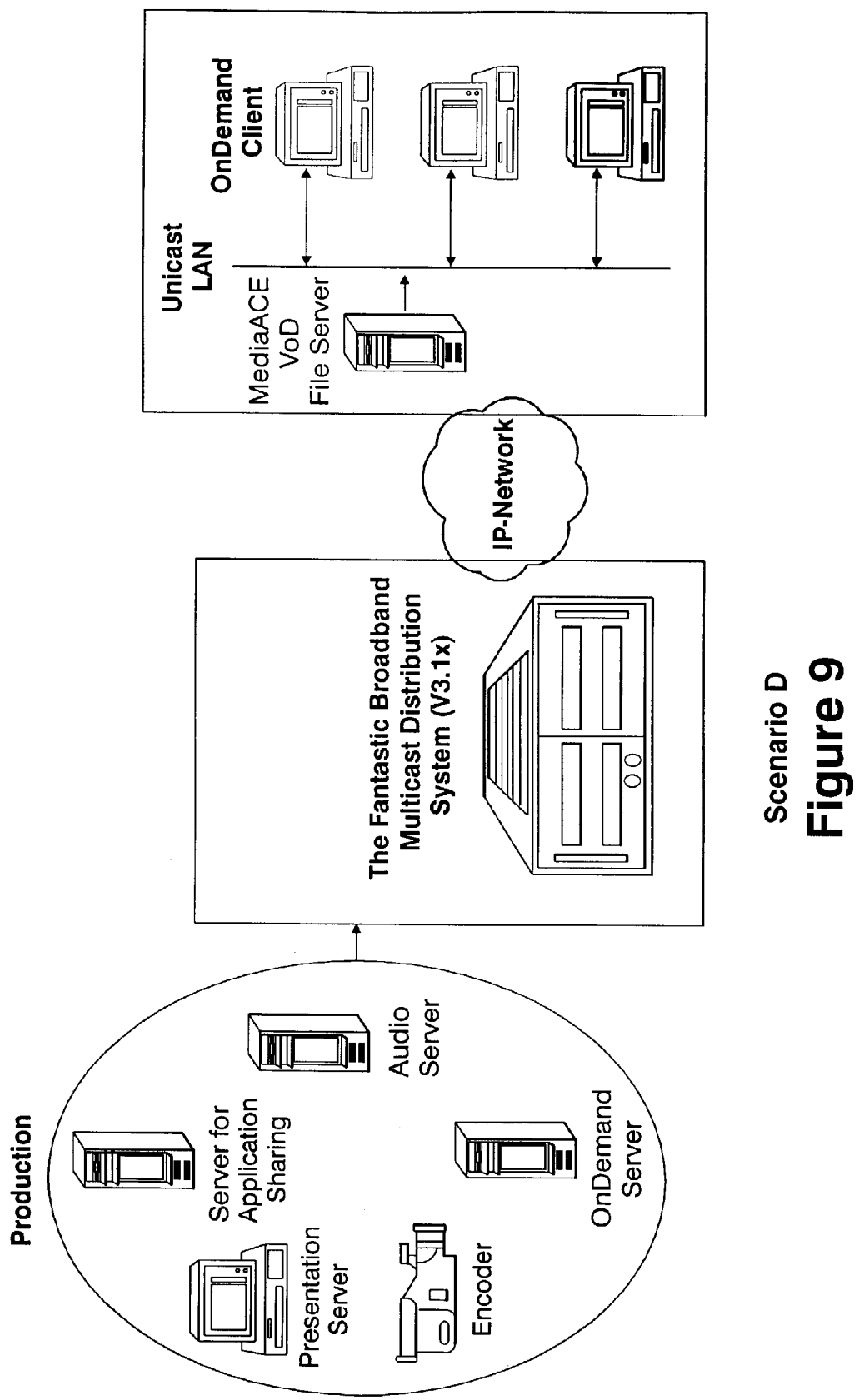
FIG. 9 illustrates a fourth operating scenario in accordance with the invention.

In the scenario of FIG. 9, on-demand sessions are broadcast to the MA, stored on a file server and downloaded to client machines 31 at their respective desktops. This scenario can be deployed in environments with a unicast LAN infrastructure. Recorded sessions are scheduled, booked, uploaded, broadcast and stored as described above. Users/recipients trigger on-demand sessions through the MA portal page 100, 100'. By clicking on the session announcement within MA Broadcast Guide Viewer the login web page for the selected on-demand session is opened up. After entering User Name and Password on-demand session is pulled down from file server to client desktop. Eventually, an on-demand session can be stared through the on-demand client application installed on the client desktop. This scenario improves the distribution of teaching on-demand sessions significantly since FTP downloads through the Internet are now obsolete.

With the integration of e-learning products into the CEC/CMC broadcast platform, a subscription management system (SMS) enables individual end users and specified groups of end users to be targeted, for example, for internal communication and training purposes. The integration should enable enterprises to export user data from an SMS (e.g. user name, IP- or MAC-address of client desktop, etc.) into a players' 48 user management system. Consequently, recipients of teaching sessions only have to be registered once, namely into an SMS. The process of identifying recipients for a teaching session is then:

Step 1: Enter user data into an SMS

Step 2: Create within an SMS groups of recipients for teaching sessions

Step 3: Select a group within SMS for a specific teaching session

Step 4: Export needed user data of this group to the content provider's User Management System Note that in case of the scenarios of FIGS. 8 and 9, the ability to target internal communication and training efforts directly to a specific individual cannot be supported. By using an MA, only the respective IP- or MAC-address of an MA will be entered into a SMS. Consequently, it is not possible to constitute a direct relationship between recipients of teaching sessions and the information stored in an SMS. However, a certain level of indirect grouping is still provided since only certain recipients will have access to a specific MA.

Thus, as described above, the present invention permits the merging and transmission of a wide variety of both static and dynamic audio, video, and data objects in a manner that provides control over broadcast parameters and regulation of the end-users enabled to receive the transmitted material.

While the invention has been described in conjunction with an exemplary embodiment thereof, numerous alternatives, modifications, and variations will be apparent to those skilled in the art in light of the foregoing description all of which are to be considered in light of the claims set forth below.

We claim:

1. A computer-implemented method for tunneling content across a network, the content being configured into a digital format compatible with a player that operates on a particular machine connectable to the network, comprising:

receiving subscription information to a broadcast session of the content from users;

before starting the broadcast session, transmitting an announcement containing control information concerning the broadcast session across the network to the subscribing users, the control information including content identifying data permitting controlled reception of the content by the subscribing users and including a start-time, wherein the announcement comprises a subscription message that identifies a multicast encapsulation protocol;

encapsulating the content into a format that supports multicast distribution and controlled reception at particular machines on the network, wherein encapsulating the content includes adding at least one layer of the multicast encapsulation protocol to the content; and multicasting across the network the content in the encapsulated format to a multiplicity of machines in accordance with the start-time included in the announcement, wherein the content identifying data of the control information permits selective reception of the content at particular ones of the multiplicity of machines of the subscribing users, and further wherein the at least one layer of the multicast encapsulation protocol is removed from the multicast content according to the multicast encapsulation protocol included in the subscription message at the ones of the multiplicity of machines to obtain the content in the digital format compatible with the player operating on at least one of the multiplicity of machines.

2. The method of claim 1, wherein the digital format compatible with the player is a unicast packet format, and wherein encapsulating the configured content comprises disposing the unicast packet format within a multicast packet.

3. The method of claim 1, wherein encapsulating the content comprises engrafting a packet based on the content.

4. The method of claim 3, wherein the engrafted packet comprises a header.

5. The method of claim 1, wherein removing the at least one layer of the multicast encapsulation protocol is performed by a multicast-ready interface executing on the ones of the multiplicity of machines.

6. The method of claim 1, wherein the broadcast session comprises a multicast of the content.

7. The method of claim 1, wherein the announcement is multicast.

8. The method of claim 1, wherein the announcement includes broadcast guide information.

9. The method of claim 1, wherein the subscription message further includes a time and a channel of the broadcast session.

10. The method of claim 1, wherein the subscription message further includes information necessary to decrypt the multicast content.

11. The method of claim 1, wherein the encapsulated content is multiplexed prior to multicasting across the network and demultiplexed at the ones of the multiplicity of machines.

12. The method of claim 1, further comprising providing a back-channel return path to a content provider from the multiplicity of machines.

13. A computer-implemented system for tunneling content across a network, the content being configured into a digital format, comprising:
  a network administrator configured to receive the content from a content provider and to broadcast the content in a multicast protocol across the network, the network administrator comprising a programmed machine including:
    a subscription control manager configured to receive subscription information to a broadcast session of the content from end-users;
    a broadcast guide broadcaster configured to transmit an announcement containing control information that includes subscription data concerning the broadcast session to machines of subscribing end-users that are in communication with the network, the control information automatically permitting controlled reception of the content by the subscribing end-users based upon the subscription information received from the subscribing end-users and including a start-time, the announcement being broadcast prior to the broadcast of the content, wherein the announcement comprises a subscription message that identifies a multicast encapsulation protocol that is employed in encapsulating the content; and
    a UTP broadcaster configured to apply the multicast encapsulation protocol to the content and to multicast the encapsulated content across the network to the machines of the subscribing end-users, wherein the UTP broadcaster is configured to add at least one layer of the multicast encapsulation protocol to the content according to the multicast encapsulation protocol identified in the subscription message;
  wherein the multicast encapsulation protocol identified in the subscription message enables removing the at least one layer of the multicast encapsulation protocol to obtain the content playable with a player at the machines of the subscribing end-users.

14. The system of claim 13, wherein the UTP broadcaster is further configured to receive the content from the content provider, transform the content into UDP streams, and encapsulate the UDP streams within CDMP packets.

15. The system of claim 13, further comprising a scheduling system configured to schedule the start-time for multicasting the encapsulated content across the network.

16. The system of claim 15, wherein the start-time is scheduled in view of a required bandwidth of the content.

17. The system of claim 13, wherein the network administrator comprises a channel management center, and wherein the content provider comprises a channel editing center.

18. The system of claim 13, wherein the UTP broadcaster has a prescribed IP address setting and a prescribed port setting, and wherein the UTP broadcaster is configured to receive the content from the content provider at the prescribed IP address and at the prescribed port.

19. The system of claim 13, wherein the configured content includes a plurality of media objects selected from the group consisting of data files, streaming audio, and streaming video.

20. The system of claim 13, wherein the network administrator further comprises a channel management center kernel configured to manage broadcast requests received from the content provider and to communicate the broadcasts to subscribing end-users using the broadcast guide broadcaster.

21. The system of claim 13, wherein individual machines of the subscribing end-users have a multicast-ready interface and a player, and wherein the machines are connectable to the network, and wherein the multicast-ready interface is configured to receive CDMP streams and to output streams that are compatible to the player.

22. The system of claim 21, wherein the machines have one or more players, and wherein the UTP broadcaster is configured to multicast the encapsulated content across the network to the subscribing end-users.

23. The system of claim 21, wherein the multicast-ready interface includes a graphical user interface configured to display the transmitted announcement from the broadcast guide broadcaster.

24. The system of claim 23, wherein the transmitted announcement is displayed in the graphical user interface according to a broadcast channel on which the encapsulated content is to be multicast across the network.

25. The system of claim 23, wherein the multicast-ready interface includes a filter configured to display the transmitted announcement as a function of a subscribing end-user.

26. The system of claim 25, wherein the filter is further configured to operate based on the subscription information.

27. The system of claim 23, wherein the graphical user interface is further configured to permit a particular subscribing end-user to select one or more multicasts of encapsulated content using an input device connected to that end-user's machine.

28. The system of claim 13, further comprising a multicast-ready interface configured to use the control information provided by the broadcast guide broadcaster to selectively permit reception of the encapsulated content multicast by the UTP broadcaster.

29. The system of claim 28, wherein the multicast-ready interface is further configured to transform the encapsulated content in the multicast into a format compatible with a player, the transformation being made by removing the encapsulation applied by the UTP broadcaster.

30. The system of claim 13, wherein the UTP broadcaster is configured to multiplex the encapsulated content prior to multicasting across the network.

31. A computer-implemented method for receiving content across a network, the content being configured into a digital format compatible with a player that operates on a particular machine connectable to the network, comprising:
   subscribing to a broadcast session of the content deliverable via the network, the broadcast session having a start time;
   prior to the start time, receiving a subscription message via the network, the subscription message including at least the start time and an a multicast encapsulation protocol to be used for the broadcast session;
   receiving content of the broadcast session multicast from the network based on the start time, the content having at least one layer of the multicast encapsulation protocol;
   removing the at least one layer of the multicast encapsulation protocol from the received content according to the multicast encapsulation protocol included in the subscription message received prior to the start time; and
   after the at least one layer of the multicast encapsulation protocol is removed, playing the content with the player on the machine connectable to the network.

32. The method of claim 31, wherein the subscription message further comprises encryption information, and wherein the method further comprises decrypting the received content according to the encryption information included in the subscription message.

33. The method of claim 31, further comprising receiving a broadcast schedule from the network, and wherein subscribing to a broadcast session comprises subscribing to a broadcast session listed in the broadcast schedule.

34. The method of claim 31, further comprising determining whether the received content belongs to the subscribed broadcast session and whether the broadcast session is enabled.

35. The method of claim 34, wherein determining whether the received content belongs to the subscribed broadcast session comprises determining whether the multicast encapsulation protocol in the subscription message is suitable to unencapsulate the received content.

36. The method of claim 31, wherein the subscription message further comprises a time stamp, and the method further comprises deleting the subscription message after a time period based on the time stamp, thereby disabling removing the at least one layer of the multicast encapsulation protocol from the received content according to the multicast encapsulation protocol included in the deleted subscription message.

37. The method of claim 31, further comprising receiving a disable-service message and stopping receiving the content from the network.

38. The method of claim 31, wherein removing the at least one layer of the multicast encapsulation protocol comprises converting a multicast packet into a unicast packet.

39. A computer-implemented system for receiving content from a network, the content being configured into a digital format compatible with a player that operates on a particular machine connectable to the network, comprising a computer-storage medium containing instructions that cause a processor to perform a process comprising:
   subscribing to a broadcast session of the content deliverable via the network, the broadcast session having a start time;
   receiving a subscription message via the network prior to the start time of the broadcast session, the subscription message including at least the start time and a multicast encapsulation protocol to be used for the broadcast session;
   receiving content of the broadcast session multicast from the network based on the start time, the content having at least one layer of the multicast encapsulation protocol; and
   removing the at least one layer of the multicast encapsulation protocol from the received content according to the multicast encapsulation protocol included in the subscription message received prior to the start time; and
   after the at least one layer of the multicast encapsulation protocol is removed, playing the content with the player on the machine connectable to the network.

40. The system of claim 39, wherein the subscription message further comprises encryption information, and wherein the process performed by the processor further comprises decrypting the received content according to the encryption information included in the subscription message.

41. The system of claim 39, wherein the process performed by the processor further comprises receiving a broadcast schedule from the network and subscribing to a broadcast session listed in the broadcast schedule.

42. The system of claim 39, wherein the process performed by the processor further comprises determining whether the received content belongs to the subscribed broadcast session and whether the broadcast session is enabled.

43. The system of claim 39, wherein the process performed by the processor further comprises determining whether the multicast encapsulation protocol in the subscription message is suitable to unencapsulate the received content.

44. The system of claim 39, wherein the subscription message further comprises a time stamp, and wherein the process performed by the processor further comprises deleting the subscription message after a time period based on the time stamp, thereby disabling removing the at least one layer of the multicast encapsulation protocol from the received content according to the multicast encapsulation protocol included in the deleted subscription message.

45. The system of claim 39, wherein the process performed by the processor further comprises receiving a disable-service message and stopping receiving the content from the network.

46. A computer-implemented system for providing content via a network, the content being configured into a digital format compatible with a player that operates on a particular machine connectable to the network, comprising a computer-storage medium containing instructions that cause a processor to perform a method comprising:
   receiving subscription information to a broadcast session of the content from subscribing machines;
   sending a subscription message via the network prior to a start time of the broadcast session to at least one of the subscribing machines, the subscription message including at least the start time and a multicast encapsulation protocol to be used for the broadcast session;
   encapsulating content of the broadcast session according to the multicast encapsulation protocol, the encapsulated content having at least one layer of the multicast encapsulation protocol; and
   broadcasting the encapsulated content via the network to the at least one subscribing machine based on the start time, wherein the multicast encapsulation protocol in the subscription message permits removing the at least one layer of the multicast encapsulation protocol from received content to enable playing the content with the player at the at least one subscribing machine.

47. The system of claim 46, wherein the method performed by the processor further comprises receiving the content from a content provider, transforming the content into UDP streams, and encapsulating the UDP streams within CDMP packets.

48. The system of claim 46, wherein the method performed by the processor further comprises scheduling the start-time for broadcasting the encapsulated content and providing the scheduled start-time to the at least one subscribing machine.

49. The system of claim 46, wherein the method performed by the processor further comprises accepting a subscription request from the at least one subscribing machine and sending the subscription message via the network according to the accepted subscription request.

50. The system of claim 46, wherein the method performed by the processor further comprises sending a subscription message including a time stamp that causes the subscription message to be deleted at the at least one subscribing machine after a time period based on the time stamp.

51. The system of claim 46, wherein the method performed by the processor further comprises altering the start time to disable reception by the at least one subscribing machine.

52. The system of claim 46, wherein the method performed by the processor comprises sending a subscription message via the network prior to the start time of the broadcast session to the at least one subscribing machine, the subscription message including at least the start time, the multicast encapsulation protocol, and encryption information, and wherein the process performed by the processor further comprises modifying the encryption information to disable reception by the at least one subscribing machine.

53. A computer-implemented method for providing content via a network, the content being configured into a digital format compatible with a player that operates on a particular machine connectable to the network, comprising:
receiving subscription information to a broadcast session of the content from subscribing machines;
sending a subscription message via the network prior to a start time of the broadcast session to at least one of the subscribing machines, the subscription message including at least the start time and a multicast encapsulation protocol to be used for the broadcast session;
encapsulating content of the broadcast session according to the multicast encapsulation protocol, the encapsulated content having at least one layer of the multicast encapsulation protocol; and
broadcasting the encapsulated content via the network to the at least one subscribing machine based on the start time, wherein the multicast encapsulation protocol in the subscription message permits removing the at least one layer of the multicast encapsulation protocol from received content to enable playing the content with the player at the at least one subscribing machine.

54. The method of claim 53, further comprising receiving the content from a content provider, transforming the content into UDP streams, and encapsulating the UDP streams within CDMP packets.

55. The method of claim 53, further comprising scheduling the start-time for broadcasting the encapsulated content and providing the scheduled start-time to the at least one subscribing machine.

56. The method of claim 53, further comprising accepting a subscription request from the at least one subscribing machine and sending the subscription message via the network according to the accepted subscription request.

57. The method of claim 53, further comprising sending a subscription message including a time stamp that causes the subscription message to be deleted at the at least one subscribing machine after a time period based on the time stamp.

58. The method of claim 53, further comprising altering the start time to disable reception by the at least one subscribing machine.

59. The method of claim 53, wherein sending a subscription message comprises sending a subscription message via the network prior to the start time of the broadcast session to the at least one subscribing machine, the subscription message including at least the start time, the multicast encapsulation protocol, and encryption information, and wherein the method further comprises modifying the encryption information to disable reception by the at least one subscribing machine.

* * * * *

UNITED STATES PATENT AND TRADEMARK OFFICE
CERTIFICATE OF CORRECTION

| | | |
|---|---|---|
| PATENT NO. | : 7,966,414 B2 | Page 1 of 1 |
| APPLICATION NO. | : 10/278722 | |
| DATED | : June 21, 2011 | |
| INVENTOR(S) | : Cinghita et al. | |

It is certified that error appears in the above-identified patent and that said Letters Patent is hereby corrected as shown below:

Column 1, line 2, below Title insert -- CROSS-REFERENCE TO RELATED APPLICATIONS --.

Column 12, line 43, in Claim 1, delete "to the" and insert -- to --.

Column 13, line 49, in Claim 13, delete "content" and insert -- configured content --.

Column 15, line 13, in Claim 31, delete "an a" and insert -- a --.

Column 15, line 55, in Claim 38, delete "ofthe" and insert -- of the --.

Signed and Sealed this
Eighteenth Day of October, 2011

David J. Kappos
*Director of the United States Patent and Trademark Office*